Nov. 7, 1950  F. G. KIEKHOEFEL ET AL  2,528,887
MEANS FOR PURIFYING SEWAGE AND THE LIKE

Filed Dec. 18, 1947

INVENTOR.
FRED G. KIEKHOEFEL.
LOUIS J. NEMECSEK.
BY
C. P. Goepel
their Attorney

Patented Nov. 7, 1950

2,528,887

UNITED STATES PATENT OFFICE 2,528,887

MEANS FOR PURIFYING SEWAGE AND THE LIKE

Fred G. Kiekhoefel, Astoria, and Louis J. Nemecsek, New York, N. Y., assignors to Ralph B. Carter Company, Hackensack, N. J., a corporation of New York Application December 18, 1947, Serial No. 792,150

3 Claims. (Cl. 210—5)

This invention relates to means for purifying sewage and the like.

The invention contemplates the use of known tanks and methods and improves thereon in that the fluid after having passed through the trickling filter is not returned directly to the trickling filter, but is by-passed or shunted and brought back to the main flow, after having been mixed with the material which has undergone settling in the settling tank. The discharge of the trickling filter is mixed with a part of the contents of the settling tank and then instead of being returned to the trickling filter, is brought into an intermediate tank usually used for dosing, which intermediate tank is between the primary settling tank and the trickling filter. It is important to intermix the fluid in the so-called final settling tank with the incoming fluid discharged by the trickling filter, and for this purpose a special mixing chamber is arranged in the final settling tank. Preferably this chamber is formed by a substantially vertical partition transverse to the settling tank, having a space between the lower edge of said partition and the adjacent vertical wall of the tank, with the orifices of the incoming pipe and of the outgoing pipe disposed in respect to each other, and to said space, and to the upper edge of the partition, to bring about a mixing of the incoming fluid with the fluid of the final settling tank.

The invention consists in the provision of such a mixing chamber in the so-called final settling tank, since other secondary tanks may be used for the final settling, to receive fluid from the trickling tank and discharge it to a pump tank for discharge to the intermediate or dosage tank.

The invention will be more fully described hereinafter, an embodiment shown in the drawings, and the invention will be finally pointed out in the claims.

In the accompanying drawings.

Similar characters of reference indicate corresponding parts throughout the various views.

Figure 1:
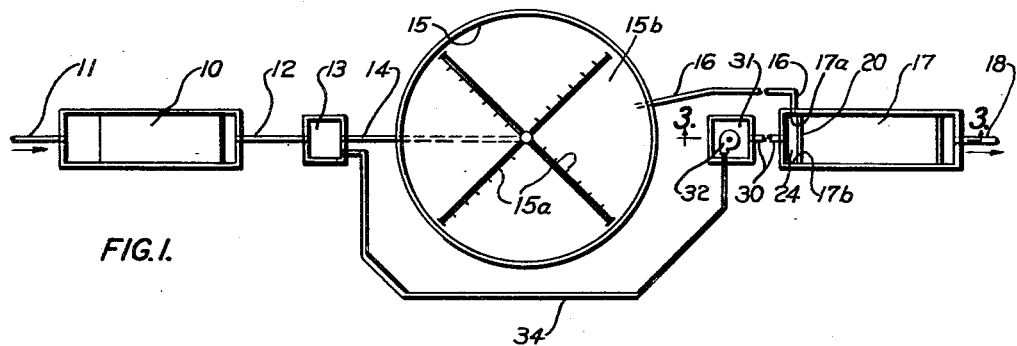
Fig. 1 is a diagrammatic plan view of the essential known elements used to carry out the invention with the present improvement combined therewith.
Figure 2:
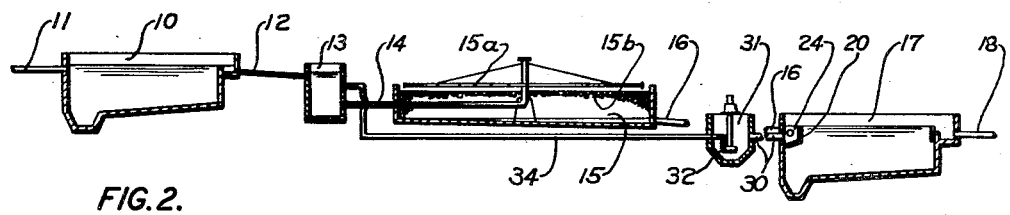
Fig. 2 is a side view of Fig. 1.
Figure 3:
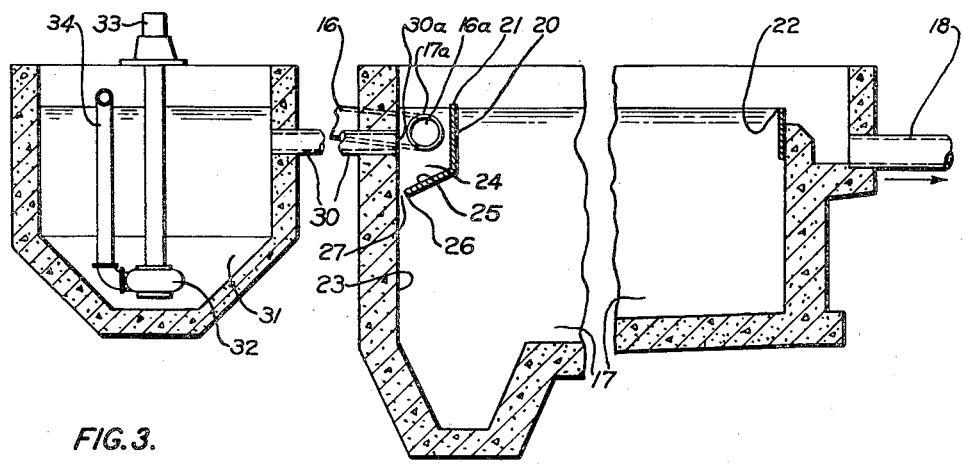
Fig. 3 is a vertical section taken on line 3—3 of Fig. 1, showing part of the improvement.

Referring to the drawings, the primary settling tank 10 receives its material from the supply pipe 11, and discharges into pipe 12, which empties into the intermediary tank 13, sometimes used for dosing. A discharge pipe 14 from the tank 13, discharges over the trickling tank 15 with known trickler jets 15a for the known trickling filter 15b, in the manner well known. From the bottom of the trickling tank 15, a pipe 16 extends into one end of a settling tank 17, which may be either the final settling tank or one of a series of tanks; and the settling tank 17 has a discharge pipe 18.

The improvement consists in providing the settling tank 17 with a transverse partition 20, which has its upper edge 21 slightly higher than the fluid level edge 22 of the tank 17. Preferably this edge 22 is vertically adjustable. The partition 20 which is generally vertical is spaced from the wall 23 of the vertical tank 17, a suitable distance to provide a mixing chamber 24, and has an inclined bottom 25, which has its lower edge 26 spaced from the vertical wall 23 of the tank 17. Any incoming fluid thus mixes in the chamber 24. The importance of the spacing 27 extending along the lower edge 26 and the vertical wall 23 is that the material in the tank 17 flows upwardly through the transverse space 27 and mixes in the chamber 24 with the mixed material therein. The pipe 16 preferably terminates in the side wall 17a of the tank 17 and the fluid flows generally transversely along the transverse partition 20 towards the opposed side wall 17b, with part of the fluid descending through the space 27 into the tank 17; and part of the fluid in tank 17 ascending through the space 27 into the chamber 24, from which the so mixed fluid flows out of the pipe 30 which has its orifice 30a disposed about intermediate of the height of the chamber 24 and generally slightly below the incoming fluid orifice 16a of pipe 16. This co-relationship of fluid movements results from their position in respect to the walls of the chamber 24, and the space 27. The next important step is to shunt this mixture away from the trickling tank 15 and back into the intermediate tank 13.

A pipe 30 communicates with the chamber 24 and discharges into a pumping station tank 31, in which a pump 32 is driven by a motor 33. The pump 32 drives the fluid in the tank 31 through a pipe 34 which shunts the trickling tank 15, and discharges into the intermediate tank 13.

We have described an embodiment of the invention, but obviously various changes may be made in the details disclosed without departing from the spirit of the invention as set out in the following claims.

We claim:

1. In an apparatus for purifying sewage having a receiving tank, an intermediate dosing tank, a trickling tank, and a final settling tank, the combination of a pipe leading from the trickling tank and having its orifice in the settling tank, a discharge pipe for the settling tank having its orifice adjacent to the orifice of the first named pipe, and a substantially vertical partition wall disposed to connect opposite walls of the settling tank at parts thereof to separate both of said orifices from the main body of the settling tank, said partition wall extending downwardly below said orifices and having its lower edge spaced from a wall of the settling tank to provide a conduit passage, the side of the partition wall facing the orifices forming with the wall of the settling tank a mixing chamber, whereby the mixing chamber formed with the settling tank by said partition wall receives trickling tank liquid from the trickling tank pipe orifice, receives settling tank liquid through said conduit passage, and the contents of the mixing chamber passes out of the said discharge pipe.

2. The structure of claim 1, with a pipe leading from the dosing tank, and a pump pumping the discharge of said mixing chamber discharge pipe to the dosing tank through said pipe.

3. The structure of claim 1, in which the pipe from the trickling tank has its orifice in a wall of the settling tank to discharge its contents parallel with the partition wall, and the mixing chamber discharge has its orifice below the orifice of the first named pipe, and substantially intermediate the height of the partition wall.

FRED G. KIEKHOEFEL.
LOUIS J. NEMECSEK.

REFERENCES CITED

The following references are of record in the file of this patent:

UNITED STATES PATENTS

| Number | Name | Date |
|---|---|---|
| 2,141,979 | Halvorson et al. | Dec. 27, 1938 |
| 2,283,166 | Buell et al. | May 19, 1942 |
| 2,419,963 | Short et al. | Apr. 29, 1947 |

FOREIGN PATENTS

| Number | Country | Date |
|---|---|---|
| 475,354 | Great Britain | of 1937 |